(12) United States Patent
Sadler

(10) Patent No.: US 9,263,899 B2
(45) Date of Patent: Feb. 16, 2016

(54) POWER CONDITIONING SYSTEM

(75) Inventor: Lawrence Sadler, Palmetto, FL (US)

(73) Assignee: L.R.S. Innovations, Inc., Palmetto, FL (US)

( * ) Notice: Subject to any disclaimer, the term of this patent is extended or adjusted under 35 U.S.C. 154(b) by 801 days.

(21) Appl. No.: 13/532,747

(22) Filed: Jun. 25, 2012

(65) Prior Publication Data

US 2012/0326510 A1  Dec. 27, 2012

Related U.S. Application Data

(60) Provisional application No. 61/500,744, filed on Jun. 24, 2011.

(51) Int. Cl.
*H02J 1/00* (2006.01)
*H02J 3/00* (2006.01)
*H02J 7/00* (2006.01)
*H02J 3/28* (2006.01)
*B60L 11/14* (2006.01)
*H02J 7/34* (2006.01)

(52) U.S. Cl.
CPC ............... *H02J 7/0024* (2013.01); *B60L 11/14* (2013.01); *H02J 3/28* (2013.01); *H02J 7/345* (2013.01); *Y02T 10/7055* (2013.01); *Y10T 307/516* (2015.04)

(58) Field of Classification Search
CPC ........... H02J 7/0024; H02J 7/345; H02J 3/28; H02J 7/32; H02J 7/34; B60L 11/18; Y02T 10/7055
USPC ..................................................... 307/46, 85
See application file for complete search history.

(56) References Cited

U.S. PATENT DOCUMENTS

| | | | |
|---|---|---|---|
| 3,517,766 A | 6/1970 | West | |
| 3,930,192 A | 12/1975 | Dinkler | |
| 4,199,037 A | 4/1980 | White | |
| 4,307,325 A | 12/1981 | Saar | |
| 4,317,176 A | 2/1982 | Saar et al. | |

(Continued)

FOREIGN PATENT DOCUMENTS

| | | |
|---|---|---|
| DE | 10157859 A1 | 7/2002 |
| EP | 1223653 A1 | 7/2002 |

(Continued)

OTHER PUBLICATIONS

PCT/US2012/044091 International Search Report and Written Opinion, Dec. 28, 2012.

(Continued)

*Primary Examiner* — Jared Fureman
*Assistant Examiner* — Esayas Yeshaw
(74) *Attorney, Agent, or Firm* — Kunzler Law Group

(57) ABSTRACT

The present disclosure relates to a power conditioning system that includes an electrical energy source interface for connecting to an electrical energy source and includes a load interface for connecting to a load. Between the electrical energy source interface and the load interface is a plurality of electrical energy storage devices. Also included in the power conditioning system of the present disclosure is a charging switching subsystem that electrically connects a grouping of electrical energy storage devices to the electrical energy source interface for a selected time interval. A grouping includes less than all of the individual electrical energy storage devices.

28 Claims, 8 Drawing Sheets

(56) References Cited

U.S. PATENT DOCUMENTS

| | | | |
|---|---|---|---|
| 4,412,158 A | 10/1983 | Jefferson et al. | |
| 4,503,370 A | 3/1985 | Cuneo | |
| 4,698,518 A * | 10/1987 | Pacala | 307/106 |
| 4,905,579 A | 3/1990 | Dame | |
| 5,214,358 A | 5/1993 | Marshall | |
| 5,345,761 A | 9/1994 | King et al. | |
| 5,406,126 A | 4/1995 | Hadley et al. | |
| 5,498,950 A | 3/1996 | Ouwerkerk | |
| 5,563,482 A | 10/1996 | Shaw et al. | |
| 5,650,713 A | 7/1997 | Takeuchi et al. | |
| 5,754,019 A | 5/1998 | Walz | |
| 5,778,997 A | 7/1998 | Setaka et al. | |
| 5,786,640 A | 7/1998 | Sakai et al. | |
| 5,798,584 A | 8/1998 | Schaeffeler et al. | |
| 5,848,659 A | 12/1998 | Karg et al. | |
| 5,969,624 A | 10/1999 | Sakai et al. | |
| 6,018,694 A | 1/2000 | Egami et al. | |
| 6,034,506 A | 3/2000 | Hall | |
| 6,105,697 A | 8/2000 | Weaver | |
| 6,307,350 B1 | 10/2001 | Alderman | |
| 6,326,765 B1 | 12/2001 | Hughes et al. | |
| 6,346,794 B1 | 2/2002 | Odaohhara | |
| 6,481,516 B1 | 11/2002 | Field et al. | |
| 6,583,603 B1 | 6/2003 | Baldwin | |
| 6,668,954 B2 | 12/2003 | Field | |
| 6,765,368 B2 * | 7/2004 | Stone et al. | 320/131 |
| 6,800,963 B2 * | 10/2004 | Miyauchi et al. | 307/86 |
| 6,815,929 B1 | 11/2004 | Dagan et al. | |
| 6,857,492 B1 | 2/2005 | Liskey et al. | |
| 6,897,575 B1 | 5/2005 | Yu | |
| 6,982,499 B1 | 1/2006 | Kachi et al. | |
| 6,983,212 B2 | 1/2006 | Burns | |
| 7,019,413 B2 | 3/2006 | Kinoshita | |
| 7,122,979 B2 | 10/2006 | Wilton et al. | |
| 7,126,312 B2 | 10/2006 | Moore | |
| 7,147,069 B2 | 12/2006 | Maberry | |
| 7,157,884 B2 * | 1/2007 | Hacsi | 320/167 |
| 7,183,746 B1 | 2/2007 | Carter | |
| 7,245,108 B2 | 7/2007 | Chertok et al. | |
| 7,291,934 B2 | 11/2007 | Bernardi et al. | |
| 7,378,818 B2 | 5/2008 | Fowler et al. | |
| 7,434,636 B2 | 10/2008 | Sutherland | |
| 7,445,064 B2 | 11/2008 | Kim | |
| 7,469,760 B2 | 12/2008 | Kamen et al. | |
| 7,521,814 B2 | 4/2009 | Nasr | |
| 7,554,291 B2 | 6/2009 | Yoshida | |
| 7,597,388 B1 | 10/2009 | Samuel | |
| 7,615,966 B2 * | 11/2009 | Houldsworth et al. | 320/132 |
| 7,633,284 B2 | 12/2009 | Ingram et al. | |
| 7,647,994 B1 | 1/2010 | Belloso | |
| 7,673,713 B2 | 3/2010 | Betz et al. | |
| 7,772,852 B2 | 8/2010 | Fechalos et al. | |
| 7,854,203 B2 * | 12/2010 | Kumar | 105/35 |
| 7,884,569 B2 | 2/2011 | Ward | |
| 7,888,907 B2 * | 2/2011 | Litovsky et al. | 320/103 |
| 7,910,250 B2 | 3/2011 | Hsu | |
| 7,911,188 B2 | 3/2011 | Wada et al. | |
| 7,950,481 B2 | 5/2011 | Betz et al. | |
| 8,004,219 B2 | 8/2011 | Mattson | |
| 8,011,461 B2 | 9/2011 | Rodriguez et al. | |
| 2001/0019256 A1 | 9/2001 | Olsson et al. | |
| 2001/0043050 A1 * | 11/2001 | Fisher, Jr. | 320/101 |
| 2002/0153178 A1 | 10/2002 | Limonius | |
| 2005/0001593 A1 * | 1/2005 | Kawasumi et al. | 320/132 |
| 2006/0030450 A1 | 2/2006 | Kyle | |
| 2006/0092583 A1 | 5/2006 | Alahmad et al. | |
| 2006/0152189 A1 | 7/2006 | Ambrosio et al. | |
| 2006/0232238 A1 | 10/2006 | Horii | |
| 2006/0237246 A1 | 10/2006 | Severinsky et al. | |
| 2008/0094013 A1 | 4/2008 | Su | |
| 2008/0248918 A1 | 10/2008 | Sastry et al. | |
| 2008/0290877 A1 | 11/2008 | Oh et al. | |
| 2009/0103341 A1 | 4/2009 | Lee et al. | |
| 2009/0160247 A1 * | 6/2009 | Nakamura et al. | 307/9.1 |
| 2010/0044129 A1 | 2/2010 | Kyle | |
| 2010/0084207 A1 | 4/2010 | Wyall | |
| 2010/0087974 A1 | 4/2010 | Nakajima et al. | |
| 2011/0087393 A1 * | 4/2011 | Verbrugge et al. | 701/22 |
| 2011/0127958 A1 | 6/2011 | Ishishita et al. | |
| 2011/0140649 A1 | 6/2011 | Choi | |
| 2012/0274145 A1 | 11/2012 | Taddeo | |
| 2013/0127419 A1 | 5/2013 | Peter et al. | |

FOREIGN PATENT DOCUMENTS

| | | |
|---|---|---|
| JP | 08289407 | 11/1996 |
| JP | 2000014031 | 1/2000 |
| JP | 2002124302 | 4/2002 |
| JP | 2003092804 | 3/2003 |
| JP | 2010143310 | 7/2010 |
| WO | 2011/056998 A3 | 5/2011 |

OTHER PUBLICATIONS

PCT/US2012/044093 International Search Report and Written Opinion, Jan. 7, 2013.
U.S. Appl. No. 13/532,737 Office Action, Nov. 7, 2013.
U.S. Appl. No. 12/590,072 Office Action dated Aug. 16, 2012.
Supplementary European Search Report, Jul. 1, 2015.

* cited by examiner

POWER CONDITIONING SYSTEM

CROSS-REFERENCES TO RELATED APPLICATIONS

This application claims the benefit of U.S. Provisional Patent Application No. 61/500,744 entitled "Electric Vehicle with Onboard Generation," which was filed on Jun. 24, 2011 for Lawrence Sadler. This application is filed on the same day as a related application by the same inventor entitled Electric Vehicle with serial number (to be inserted later), which is hereby incorporated by reference into this document.

FIELD

This invention relates to power conditioning systems.

BACKGROUND

Electricity is the flow of electrical charge from a higher potential to a lower potential. The energy that results from the flow of electrical charge has been employed in myriad applications, including transportation, heating, lighting, and communications, among others. Because of electricity's extensive utility in the modern world, numerous devices and systems require access to this flow of electrical charges in order to function. Whether it's heating a filament in a light bulb, powering a motor in an electric car, or flowing through complex circuits inside a computer, electricity must be controlled and manipulated to meet the various energy requirements of countless devices.

The "amount of electricity" in a flow of charges is characterized by current and voltage. Generally, current is the volume or quantity of charge flowing in a circuit and voltage is the energy carried per unit charge. If too much electricity, either current or voltage, flows through a given circuit, the components of that circuit may be damaged or destroyed. Conversely, if not enough electricity is supplied to a system, it may not function properly, if it is able to function at all. In other words, it is very difficult for electrical control systems to effectively manipulate the flow of electrical charges so that the supply meets the demand in both quantity and quality.

For example, conventional control systems in automobile engines are designed to manage varying power demands by increasing power output when a driver presses down on the gas pedal (e.g. in order to accelerate the vehicle or to maintain a constant speed while climbing a hill). In another example, a coal power plant is designed to meet the demands of an electrical grid by controlling the quantity of coal entering the boiler, which in turn affects the rate of steam formation and thus affects the power produced in the turbine generators. In other electrical systems, such as in residential wiring or in complex computer circuits, safety mechanisms are used to ensure that excess current and voltage do not damage or destroy components of the system. For example, without fuses and circuit breakers, many household items would be damaged if an event caused a dramatic rise in the voltage flowing through residential wiring. In computer circuits, amplifiers and resistors can be used to increase or decrease the voltage and current that flow to individual components in the circuit.

The problem with these conventional power schemes and electrical systems is their inefficiency in managing varying supplies and/or varying demands. Continuing with the examples above, increasing and decreasing an automobile engine's RPM to meet acceleration demands can cause the engine to operate at other than optimal efficiency. Also, controlling power generation by altering the input flow of coal involves a substantial delay in response time, which can result in either a temporary excess or a shortage of power. Conventional power plant control systems may attempt to mitigate this problem by storing excess energy via pumped hydroelectric storage or by quickly generating more energy by introducing natural gas into the boiler; however, these measures decrease the total efficiency of power generation. In conventional household wiring and computer circuits, electrical control systems attempt to manage varying energy supplies by providing energy sinks or circuit breaks to protect sensitive components.

Thus, regardless of whether a control scheme is employed on the supply side (controlling energy source input flow) to meet a varying demand or on the demand side (providing sacrificial energy sinks or circuit breaks) to meet a varying supply, conventional electrical systems are often inadequate in efficiently managing a the varying supply and demand requirements of loads that draw upon them.

SUMMARY

From the foregoing discussion, it should be apparent that a need exists for a manner of efficiently managing an electrical system's varying supply and demand requirements. Beneficially, such a system involves a plurality of electrical energy storage devices that are successively charged and discharged in a scheme that matches the supply with the demand.

The subject matter of the present application has been developed in response to the present state of the art, and in particular, in response to the problems and needs in the art that have not yet been fully solved by currently available electrical systems. Accordingly, the present disclosure has been developed to provide a system for managing varying demands on an electrical system that overcomes many or all of the above-discussed shortcomings in the art.

The present disclosure relates to a power conditioning system that includes an electrical energy source interface for connecting to an electrical energy source and includes a load interface for connecting to a load. Between the electrical energy source interface and the load interface is a plurality of electrical energy storage devices. Also included in the power conditioning system of the present disclosure is a charging switching subsystem that electrically connects a grouping of electrical energy storage devices to the electrical energy source interface for a selected time interval. A grouping includes less than all of the individual electrical energy storage devices.

In one embodiment, a grouping of electrical energy storage devices includes a single electrical energy storage device while in other embodiments a grouping includes multiple electrical energy storage devices. The electrical energy storage devices may include capacitors, super-capacitors, batteries, inductors, hybrid batteries, and other devices which store electricity. The devices may actually be packs of individual battery cells or capacitors.

In one embodiment, the system further includes a discharging switching subsystem that electrically disconnects the grouping of electrical energy storage devices from the load interface for the selected time interval. In another embodiment, the power conditioning further includes a second discharging switching subsystem for controlling the discharging configuration of the electrical energy storage devices.

The discharging configuration may be a series configuration, a parallel configuration, or a series-parallel combination configuration. The load, through the load interface, may be powered solely from the electrical energy storage devices or supplemental power sources may also be used to power the load.

Also, the switching systems may include processors and electronic switching devices for controlling which electrical energy storage devices are being charged, which ones are being discharged, and the configuration that they are discharging in. The processor(s) selectively control the opening and closing of the switching devices. In one embodiment, the electronic switching devices are electromechanical relays.

The switching devices control the time interval during which the electrical energy storage devices are charged/discharged. In one embodiment the selected time interval is in the range of between about 0.001 seconds and 5.0 seconds. In another embodiment, the selected time interval is in the range of between about 0.01 seconds and 1.0 second. In yet another embodiment the selected time interval is about 0.1 seconds. The system in one embodiment may include four electrical energy storage devices. In another embodiment the system includes eight electrical energy storage devices.

In one embodiment of the system, the neutral source connection of the interface is not directly connected to a system ground but is instead connected to the switching devices. The electrical energy storage devices may need to retain a certain charge level in order for the system to maintain functionality. In one embodiment, the electrical energy storage devices must retain a charge of at least 75%. In another embodiment, they must retain a charge of at least 90%.

The system may also include electricity flowing out of the electrical energy source that is less than the maximum power output of the combined electrical energy storage devices. In another embodiment, a first voltage and a first current flow out of the electrical energy source to charge the electrical energy storage devices and a second voltage and a second current are flow out of the electrical energy storage devices to power the load, wherein the first voltage is different than the second voltage and the first current is different than the second current.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Figure 1:
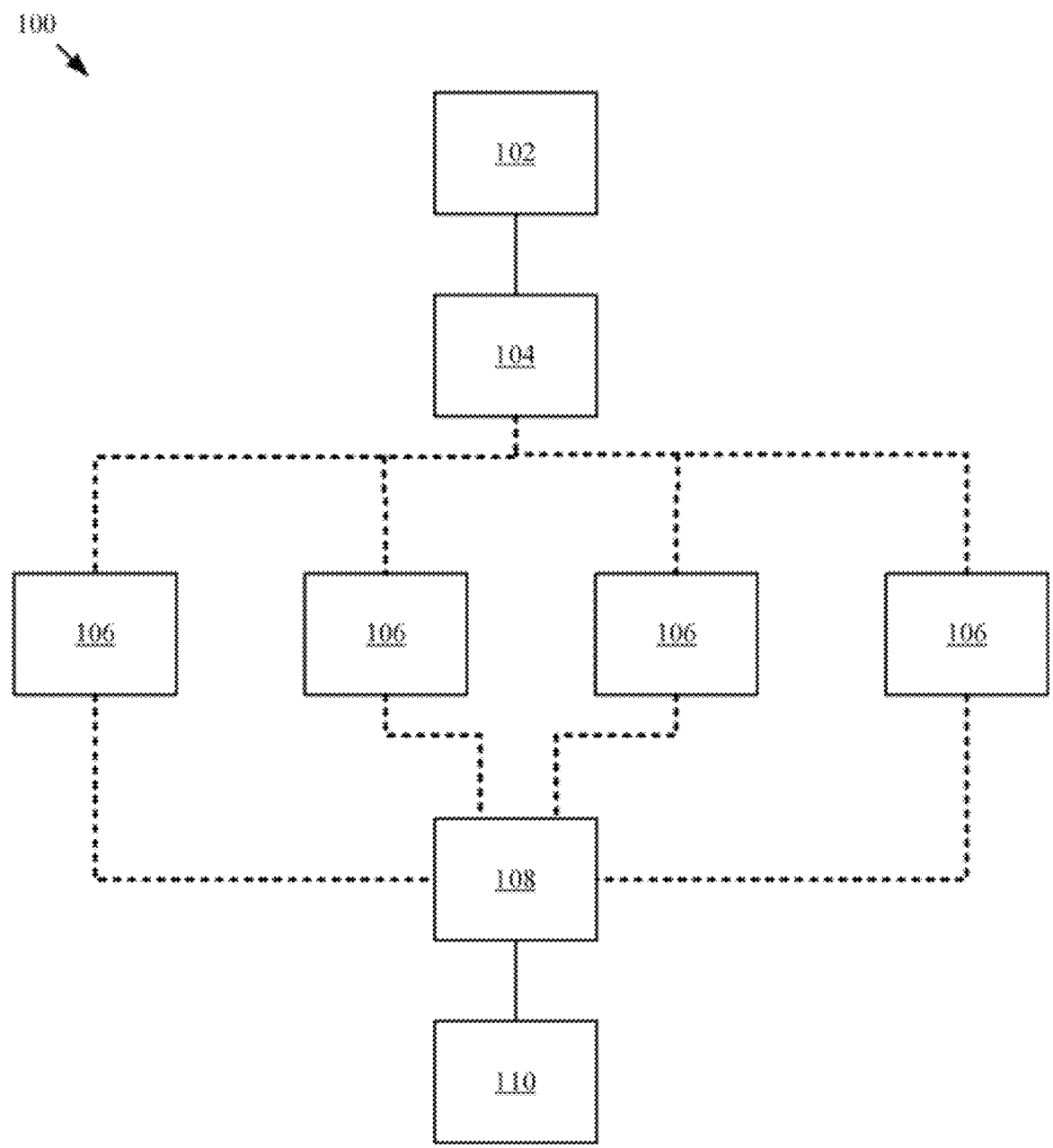
FIG. 1 is a schematic block diagram of one embodiment of a power conditioning system that includes an electrical energy source, a charging switching subsystem, a plurality of electrical energy storage devices, a discharging switching subsystem, and a load.

FIG. 1 is a schematic block diagram of one embodiment of a power conditioning system 100 for matching a power supply with a power demand. The system 100, in one embodiment, includes an electrical energy source 102, a charging switching subsystem 104, a plurality of electrical energy storage devices ("EESDs") 106, a discharging switching subsystem 108, and a load 110. The electrical energy source 102, which is described below with reference to FIG. 2, generally produces or generates electricity and may include various conditioning components.

The charging switching subsystem 104 which is described below with reference to FIG. 3, generally cycles through the individual EESDs 106, successively charging each one and may include, in one embodiment, multiple mechanical switches or relays and a processor control unit. The plurality of interconnected EESDs 106, which is described below with reference to FIG. 4, stores electricity produced by the electrical energy source 102 and provides power to the load 110. Details relating to the load 110 and further embodiments of the power conditioning system are described below with reference to FIGS. 5A-5B.

The subject matter of the present disclosure, in one embodiment, relates to a new power system constructed specifically to operate based on the power conditioning 100 system described herein. In another embodiment, the subject matter of the present disclosure relates to a conventional power system that may be retro-fitted with the power conditioning system 100 described herein. Additionally, the term "power system" is defined herein as any electrical generation system, electricity transmission system, electricity distribution system, electricity storage system, and the like.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Figure 2A:
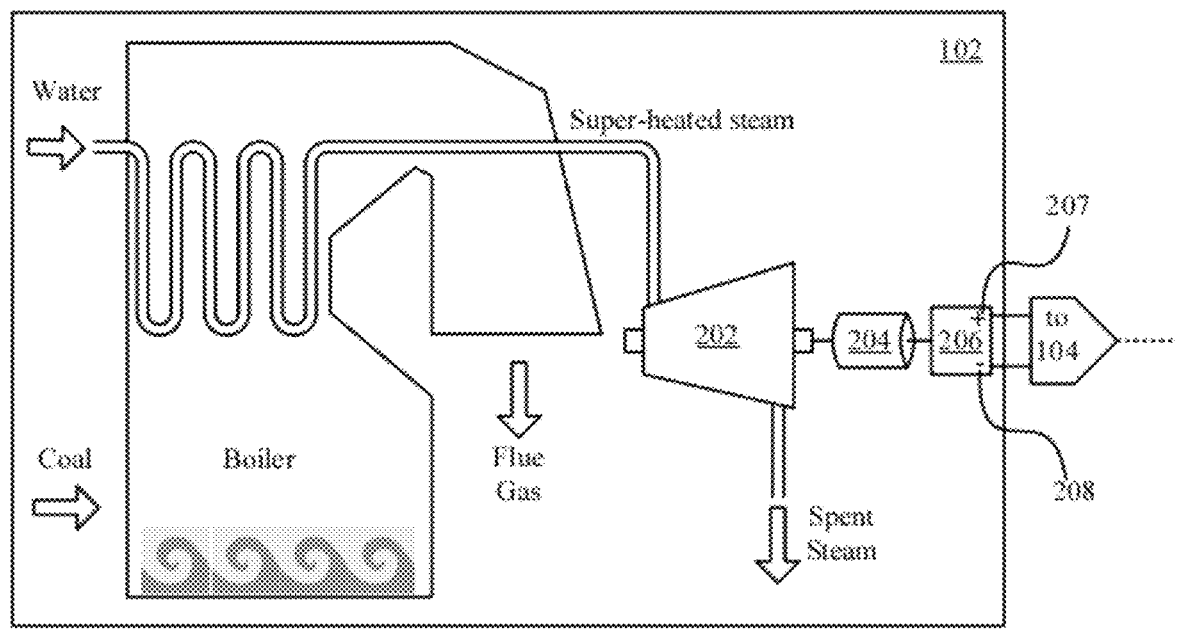
FIGS. 2A-2B depict embodiments of an electrical energy source that includes a turbine, a generator, and a rectifier.
Figure 2B:
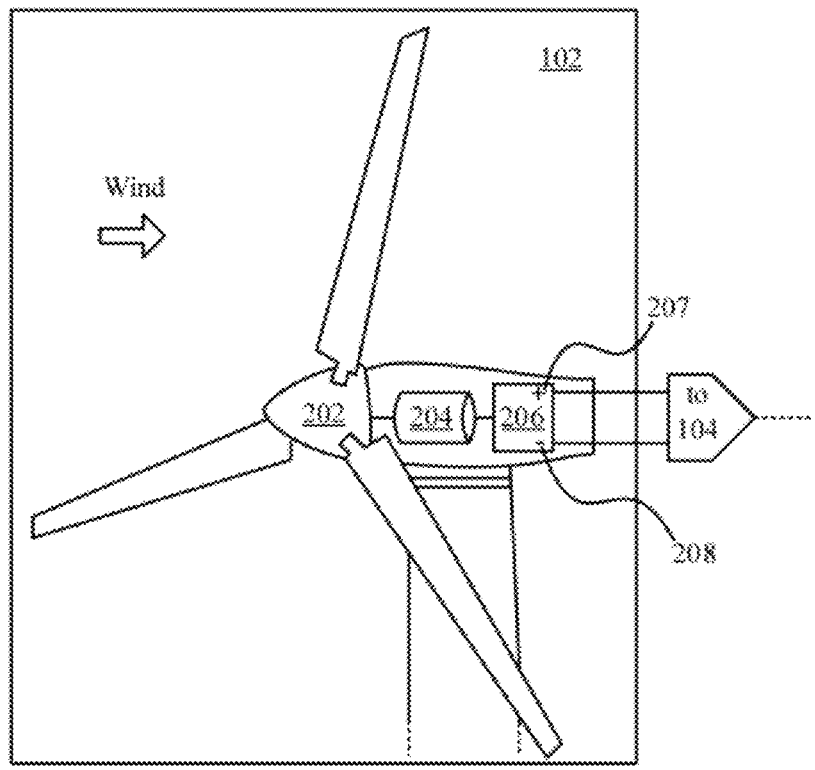

FIGS. 2A-2B are schematic block diagrams of various embodiments of an electrical energy source 102. The electrical energy source 102 may be any voltage or current source and it may be selected according to the requirements of a particular application. In one embodiment, the power conditioning system includes a direct current ("DC") source 102, such as a turbine 202 and a DC generator 204. In another embodiment, the power conditioning system 100 includes an alternating current ("AC") source 102 and further includes a rectifier 206 for converting the AC waveform into a substantially DC waveform. The source 102 may generate multiphase AC current, such as two-phase, three-phase, and the like. The rectifier 206 may include multiple rectifier units and may be sized according to the requirements of a given application.

FIG. 2A depicts a coal power plant as the electrical energy source 102. In the depicted embodiment, the electrical energy source 102 includes a steam driven turbine 202 that is coupled with an AC generator 204 that is electrically connected to a rectifier 206. The generator 204 and the rectifier 206 may be separate components (as depicted) of the electrical energy source 102 or the generator 204 and the rectifier 206 may be substantially included in a single component, such as a DC generator 204 or the like. The rectifier 206 may be a vacuum tube diode rectifier, a mercury-arc valve rectifier, solid-state diode rectifier, or a silicon-controlled rectifier, among others.

In one embodiment, the rectifier 206 includes bridge diode rectifiers ("Quicktifier" as made by Quick Start alternators of Michigan) capable of transforming three-phase AC power into a substantially DC current. Further filters or conditioning components 206 may optionally be used to smooth and otherwise condition the resulting waveform. It is contemplated that such other waveform conditioning components 206 and their equivalents, as recognized by those of ordinary skill in the art, also fall within the scope of the present disclosure.

FIG. 2B depicts a wind-powered turbine as the electrical energy source 102. In the depicted embodiment, the electrical energy source 102 includes a wind propelled turbine 202 that is coupled with an AC generator 204 that is electrically connected to a rectifier 206. In one embodiment, the electrical energy source 102 may be substantially dispatchable, such as in the coal power plant embodiment. For example, in order to increase the electricity generated by the source 102, a user or a controller increases the flow of coal into the boiler, which increases the generation rate of steam and thereby increases the electricity generated by the turbine 202 coupled with the generator 204.

However, even "dispatchable" electrical energy sources 102 still involve inherent inefficiencies when controlled with a conventional power system (see Background section above). Thus, while dispatchable electrical energy sources 102 may be repeatedly adjusted to generate the demanded power, the power conditioning system of the present disclosure increases the efficiency of such electrical energy sources 102 by limiting the adjustments that need to be dispatched and by absorbing a substantial portion of the fluctuating demand.

The electrical energy source 102 in one embodiment may include a hydrocarbon engine 202 coupled with a DC generator 204. The engine 202 may be powered by a hydrocarbon fuel such as gasoline, diesel fuel, natural gas, or hydrogen, among others. In one embodiment, the engine 202 is substantially separate from the generator 204 and the engine 202 provides the torque necessary to rotate the generator 204 rotor. For example, the engine 202 may be a conventional automobile engine, such as a 4 cylinder gasoline engine, and the generator 204 may be a separate component that is coupled with the engine 202.

In one embodiment, the electrical energy source 102 may include an engine 202 operating at a substantially fixed RPM coupled with a generator 204. The fixed RPM may be the optimal operating condition of the engine 202 for maximizing efficient power generation or it may be the operating condition required to meet the predicted and long term load 108 on the system 100. For example, if the load is predicted to be about 80-100 amps, the engine 202 may operate at approximately 1000 to 1500 RPM to meet the demand. In another embodiment, the engine 202 may be configured, via the governor or some other controlling mechanism, to operate at a sufficient rate to substantially meet the load 108 on the system 100. For example, if for a period of time the draw/demand on the EESDs 106 is greater than the power generated by the electrical energy source 102, an automatic load sensing governor may cause the engine/turbine 202 and the generator 204 to increase electricity output to match the demand.

In another embodiment, the engine/turbine 202 and the generator 204 may be substantially the same component (i.e. stand-alone portable backup generator) and the generator 204 may include a reaction chamber for combusting a hydrocarbon fuel, which powers the rotational motion of the generator rotor. The electrical energy source 102 may also include multiple engines/turbines 202 and/or multiple generators 204, as determined by the specifics of a given application.

In another example of an electrical energy source 102, the power conditioning system 100 of the present disclosure may include other electricity generation systems, such as nuclear power steam turbines and hydro-electric turbine systems. In other embodiments, the electrical energy source 102 may be substantially non-dispatchable, such as in the wind-powered embodiment. In such embodiments, a user or a controller is unable to manipulate the "amount" of electricity generated by the source 102 because the force rotating the rotor in the generator 204 is generally beyond the user's control. For example, the electrical energy source 102 may include solar power systems, geo-thermal steam turbines, tidal power generation, and the like. Non-dispatchable energy sources 102 that are not constantly generating a controllable amount of electricity may still be used in the power conditioning system 100 of the present disclosure because of the charging and discharging switching subsystems 104, 108 (see FIGS. 3A-3C) and the plurality of EESDs 106 (see FIG. 4).

In another embodiment, a user may control power generated by the electrical energy source 102. For example, a user may set the turbine/generator 202/204 to a certain operating set point according to the anticipated demand placed on the system. The user may also, in one embodiment, continuously adjust the operating level of the engine/generator 202/204 according to the instantaneous demand placed on the system by configuring an input from a controller or a user to alter the operating rate of the turbine 202 coupled with the generator 204.

As depicted in FIGS. 2A-2B, the electrical energy source 102 includes both a positive source connection 207 and a neutral source connection 208. In one embodiment, the positive source connection 207 and the neutral source connection 208 are components of the generator 204 (not depicted). In another embodiment, the positive source connection 207 and the neutral source connection 208 are components of the rectifier 206 which is electrically connected to the AC generator 204. The electrical energy source 102 may include other waveform conditioning and smoothing components as are recognized by those of skill in the art. The positive source connections 207 and the neutral source connections 208 may be electrically connected to the charging switching subsystem 104 (see FIG. 3).

In one embodiment, the electrical energy source 102 may include EESDs, such as batteries, hybrid batteries, capacitors, and inductors. The electrical energy source 102 may further include an auxiliary power source. The auxiliary power source may include secondary generators, secondary electrical storage devices and the like. The auxiliary power source may constantly supplement the power provided by the primary generator 204 or the auxiliary power source may intermittently supplement the power generated by the generator 204. The auxiliary power source may be configured to produce electricity only when certain conditions are met such as, for example, when non-dispatchable power systems fail to generate sufficient electricity.

Figure 3A:
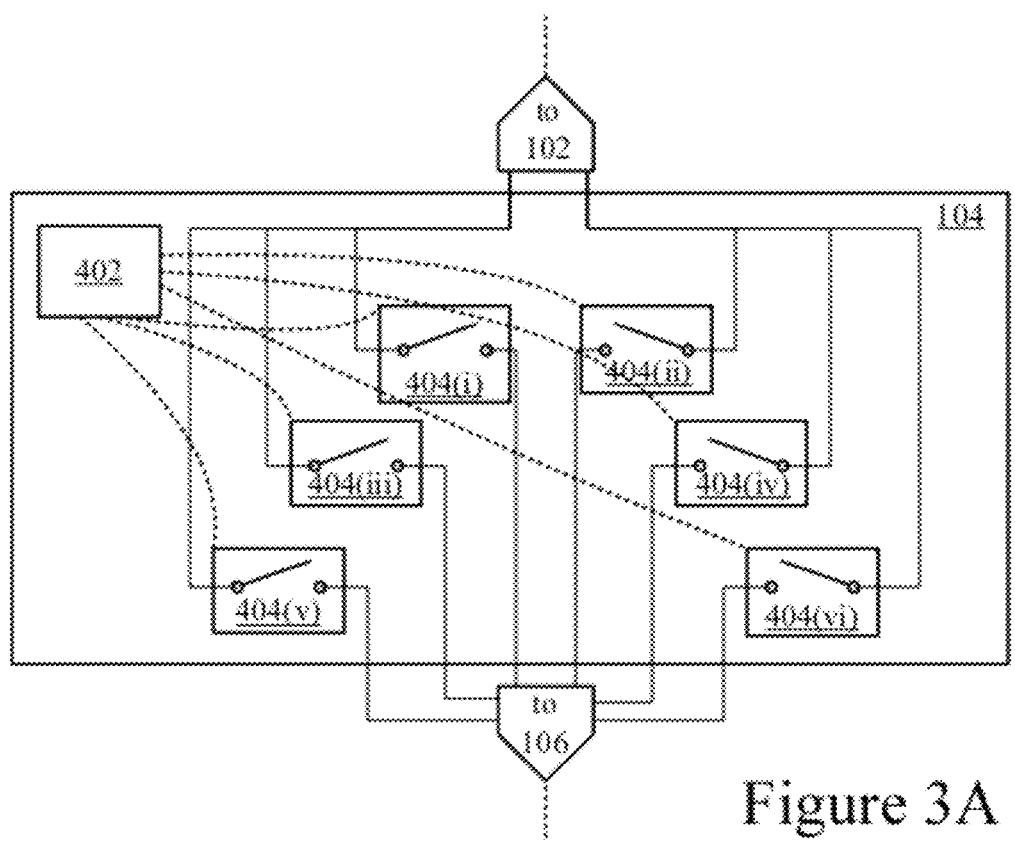
FIG. 3A is a schematic block diagram of one embodiment of a charging switching subsystem that includes a processor and multiple switching devices.
Figure 3B:
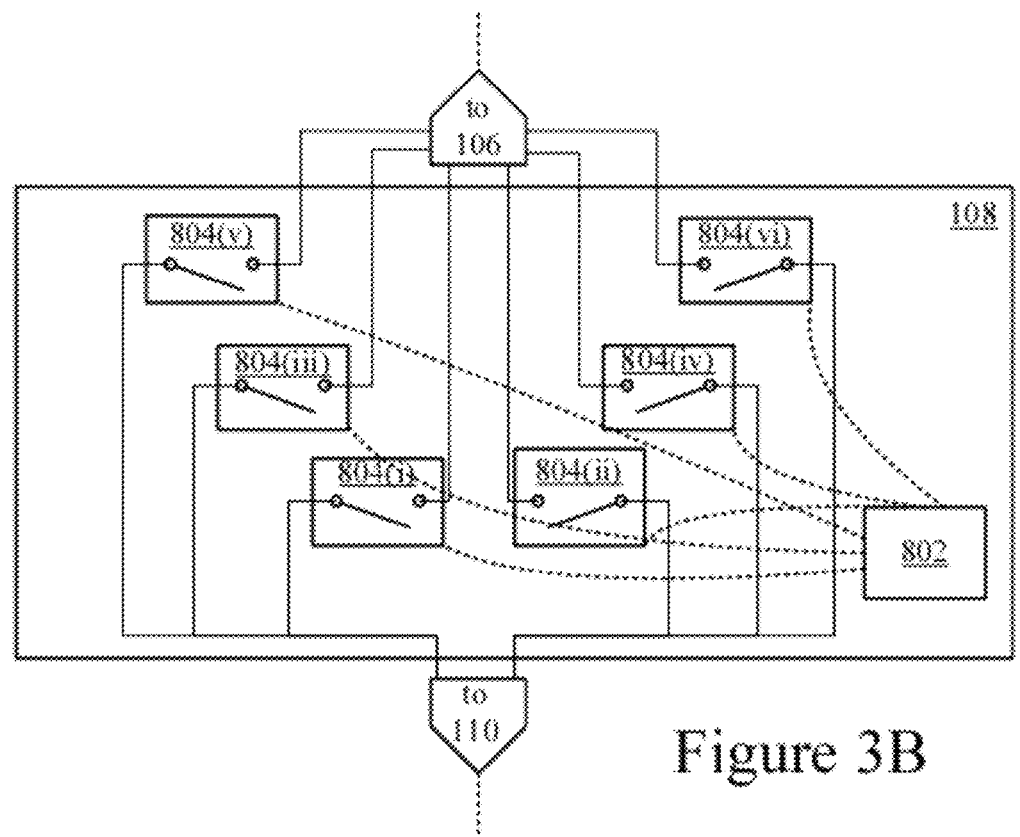
FIG. 3B is a schematic block diagram of one embodiment of a discharging switching subsystem that includes a processor and multiple switching devices.

FIGS. 3A-3B are schematic block diagrams illustrating embodiments of a charging switching subsystem 104, a discharging switching subsystem 108, and a second discharging switching subsystem 806, respectively. FIG. 3A is a schematic block diagram of one embodiment of a charging switching subsystem 104 that includes a processor 402 and a configuration of switching devices 404. The charging switching subsystem 104 selectively enables and disables the charging circuit connections so that only certain EESDs 106 or certain groupings of EESDs 106 are connected to the electrical energy source 102 at any given time.

Generally, the charging switching subsystem 104 includes a processor 402 for controlling the opening and closing of the individual switching devices 404. The processor 402 in one embodiment may be a stand-alone governor or controller configured to selectively open and close certain switching devices 404 to complete a charging circuit about a grouping of EESDs 106. In another embodiment, the processor 402 may be a component or a module of an existing controller system, such as a master computer control system in a coal power plant 102.

The charging switching subsystem 104 enables the efficient charging of the EESDs by selectively individually connecting each individual EESD 106 (or each grouping of EESDs 106) to the power source 102 for a certain time interval before moving on to the next-in-line EESD 106. The charging switching subsystem essentially sweeps though the plurality of EESDs and pulses electricity to each grouping of EESDs for a selected time interval. For example, in one embodiment there are four EESDs 106. Each of the EESDs 106 (as described below in greater detail with reference to FIG. 4) includes a positive terminal 603 and a neutral terminal 604. Each positive terminal 603 of an EESD 106 may be electrically connected to a positive switching device that is also electrically connected to the positive source connection 207 of the electrical energy source 102 and each neutral terminal 604 of an EESD 106 may be electrically connected to a neutral switching device that is also electrically connected to the neutral source connection 208 of the electrical energy source 102. Thus, in one embodiment, the neutral source connection 208 of the electrical energy source 102 is not directly connected to the system ground and the neutral source connection 208 is only connected to the charging switching subsystem 104.

The charging switching subsystem 104 effectively restricts the apparent load on the electrical energy source 102 to a single EESD 106 or a single grouping of EESDs 106. In other words, the electrical energy source 102 only "sees" one EESD 106 at a time during charging and therefore the electrical energy source 102 can be configured to generate electricity at an optimal efficiency because the apparent load (a single EESD) is substantially constant. Thus, in one embodiment, the electrical energy source 102 charges the plurality of EESDs 106 at a substantially constant rate while the EESDs 106 discharge according to the demands of the load 110 on the system 100 (see description relating to FIG. 3B). In this manner, the EESDs 106 are able to receive a charge from a variety of electrical energy sources 102, such as dispatchable and non-dispatchable energy sources (see FIGS. 2A-2B).

In an alternate embodiment, a plurality of EESDs 106 or groupings of EESDs 106 are connected to the electrical energy source 102 at a given time. Preferably in this embodiment, however, not all of the EESDs 106 are connected to the electrical energy source 102 at the same time. Furthermore, in yet another embodiment, additional electrical energy sources 102 may be applied to some or all of the remaining EESDs 106 while the original electrical energy source 102 is connected to only a portion of the EESDs 106 or groups of EESDs 106.

Thus, even in applications where the electricity produced by the electrical energy source 102 fluctuates and is beyond the control of a user, such as in non-dispatchable energy generation (i.e. wind turbines, photo-voltaic cells), the plurality of EESDs 106 may still be charged by these varying electrical energy sources by connecting the source 102 to the switching devices 404 of the charging switching subsystem 104. In this manner, the EESDs 106 in some embodiments are able to absorb fluctuations in the amount of energy produced by the source 102 and are able to deliver electricity conditioned to meet the system's demand. Thus, regardless of whether the electrical supply is fluctuating or the electrical demand is fluctuating, a power system according to the present disclosure can be used to effectively and efficiently match (both quality and quantity) the supply with the demand.

The charging switching subsystem 104 enables each EESD 106 or grouping of EESDs 106 to be charged up to the voltage of the electrical energy source 102. Therefore, upon discharge, the voltages of the EESDs 106, depending on their interconnected discharge configuration (see description relating to FIG. 3C), may sum to a voltage greater than that of the source 102 voltage. Thus, in one embodiment, the power conditioning system 100 is capable of providing a higher voltage and/or a higher current than that of the electrical energy source 102, at least for a certain period of time. Configurations capable of generating differing levels of current and voltage will be described in greater detail below with reference to the discharging switching subsystem 108 depicted in FIG. 3C.

The switching devices 404 may be, in one embodiment, electromechanical switches that either physically close or physically open a circuit. The electromechanical switches may be single pole on/off switches, multiple-pole switches, electromechanical contactor switches, electrical actuators, or relay switches, among others. The electromechanical switches have been shown to provide a better isolation in testing by the inventor.

In another embodiment, the switching devices 404 may be solid-state relays. Solid-state relays may be able to switch faster than mechanical switches; therefore, in some implementations where fast switching is required, it may be advantageous to use solid-state relays. Power transistors or other solid state switching devices may also be used.

The charging switching subsystem 104 in one embodiment includes neutral switches that are electrically isolated from the system ground. The neutral switches electrically connect the neutral source connection 208 (of FIG. 2) of the generator 204 to the neutral terminal 604 of the EESDs 106 that are being charged. One closed neutral switch and one closed positive switch effectively complete a charging circuit about an individual EESD 106 for a time interval while the other switches are held open and effectively isolate the other EESDs from the charging circuit. In other words, the EESDs 106 successively individually (or by individual groupings) receive charge from the electrical energy source 102 one at a time in repeating cycle while discharging power to the discharging switching subsystem 108.

The time interval of the charging switching subsystem 104 and the discharging switching subsystem 108 may vary depending on the specifics of a given application (i.e. characteristics of the electrical energy source, capacity of EESDs, type of EESDs, number of EESDs, requirements of the load, etc.). In one embodiment, the time interval for charging each EESD is in the range of between about 0.001 seconds and 5.0 seconds. In another embodiment, the time interval for charging each EESD is in the range of between about 0.01 seconds and 1.0 seconds. In yet another embodiment, the time interval for charging each EESD 106 is about 0.1 seconds. The charging and discharging sequence time intervals in one embodiment may be changed during operation of the power conditioning system. In one embodiment, the time interval is automatically controlled and adjusted by the controller 402/802 according to a sensed load or the charge level of the EESDs 106. In another embodiment, the time interval is manually controlled and adjusted by a user.

FIG. 3B is a schematic block diagram of one embodiment of a discharging switching subsystem 108 that includes a processor 802 and a plurality of switching devices 804. The discharging switching subsystem 108 changes the discharging circuit connections so that only certain EESDs 106 or certain groupings of EESDs 106 are connected to the load 110 at a given time.

Generally, the discharging switching subsystem 108 includes a processor 802 for controlling the opening and closing of the individual switching devices 804. The processor 802 in one embodiment may be a stand-alone governor or controller configured to close certain switching devices 804 to complete a discharging circuit about a grouping of EESDs 106. In another embodiment, the processor 802 may be a component or a module of an existing controller system, such as a master computer control system in a coal power plant 102. In another embodiment, the discharging controller 802 and the charging controller 402 are substantially the same controller, include substantially the same software modules, or are included within the same master power controller system. Also, the switching devices 804 of the discharging switching subsystem may be substantially the same as the switching devices used in the charging switching subsystem 104.

As discussed briefly above and mentioned throughout the present disclosure, the EESDs 106 in the power conditioning system may be charged/discharged individually or the EESDs may be classified into groupings for charging/discharging. The classifying of groupings in one embodiment may include physically locating or positioning the EESDs 106 in a grouping in close proximity to each other. In another embodiment, the classifying of groupings is made regardless of the relative locations or positions of the EESDs. The charging/discharging of one grouping simply represents one iteration or one step of the charging/discharging process that is performed in a repeating cycle.

In other words, groupings are selections of certain EESDs which will be charged/discharged together for a time interval. One limitation that applies to the groupings is that the same EESD is preferably not included multiple times in the same grouping (wouldn't make sense to say that one EESD would be charged/discharged "twice" during the time interval). However, a grouping may include a single EESD or may include multiple EESDs. In one embodiment during a period of operation, the power conditioning system charges/discharges each EESD for substantially the same length of time.

In another embodiment, the charging and/or discharging of a grouping may be dependent on the charge level of the EESDs. For example, if the charge level of one or more EESDs drops below a certain percentage or if the charge level of one or more EESDs is comparatively lower than other EESDs, the charging switching subsystem and/or the discharging switching subsystem may be configured to sense the charge level and adjust the time interval of the pulse charges and/or the frequency of the pulse charges accordingly. Therefore, during operation of the power conditioning system, the charging/discharging cycle may involve electrically connecting certain EESDs to the source or the load for different lengths of time.

In one embodiment, the grouping that is connected to be charged is the same grouping that is disconnected during discharge of the other groupings. In other words in one embodiment a grouping is connected to the source 102 (charged) while the remaining groupings are not connected to the source 102 (not charged). At the same time (during the same time interval), the same grouping that is connected to the source 102 is not connected to the load 110 (not discharged) but the other groupings are connected (discharged) to the load 110.

Figure 3C:
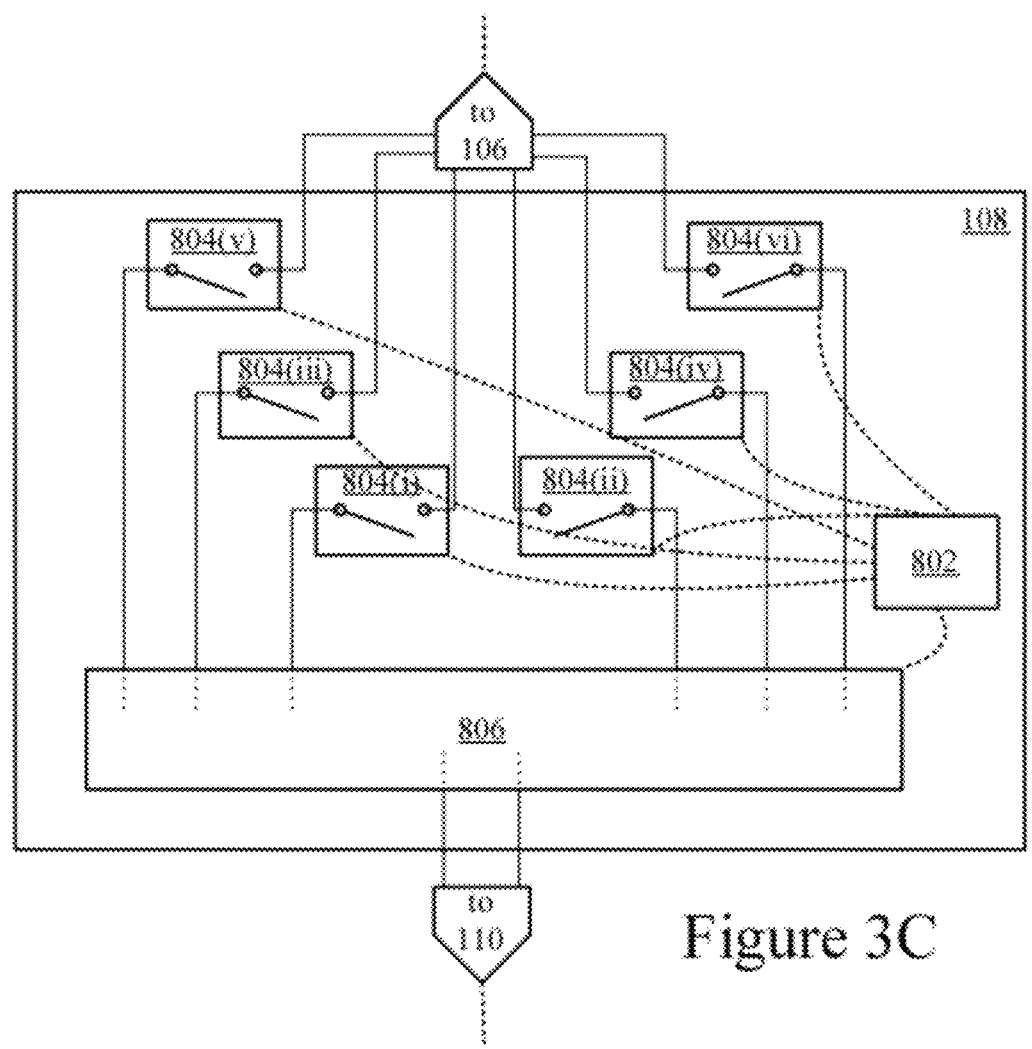
FIG. 3C is a schematic block diagram of one embodiment of a second discharging switching subsystem that includes multiple switching devices.

FIG. 3C is a schematic block diagram of one embodiment of a second discharging switching subsystem that includes a configuration of switching devices 806. The second discharging switching subsystem changes the discharging configuration of the EESDs 106 that are being discharged. In other words, the "first" discharging subsystem 108, as described above with reference to FIG. 3B, controls which EESDs are discharging and the second discharging subsystem 806 controls how the discharging EESDs are interconnected to power the load 110. The second discharging switching subsystem 806, in one embodiment, includes a separate processor and separate switching devices. In another embodiment, the processor and the switching devices of the second discharging switching subsystem 806 are substantially the same as the processor 802 and the switching devices 804 of the discharging switching subsystem 108.

The second discharging switching subsystem 806 allows the EESDs 106 to be interchangeably connected in order to provide various discharge configurations. For example, if three of four EESDs 106 are being discharged for a time interval, the three "discharging" EESDs may be connected in series to multiply the voltage powering the load 110. In another embodiment, the same three "discharging" EESDs may be connected in series to multiply the current flowing to the load 110. The output configuration of the switching subsystem 806 may be substantially static, or may be dynamically altered during operation to match the needs of the load 110.

It is contemplated that many configurations, such as hybrid parallel-series configurations, may be employed by the second discharging switching subsystem 806 in order to condition the electricity leaving the EESDs to meet the demanded power, both in quantity and quality. In another example, if four batteries, each having a charge of 12 volts/40 amps, are discharging in series, the power going to the load 110 would be 48 volts and 40 amps. In another example, the same four charged EESDs 106 may be connected in two parallel series configurations. In other words, two EESDs 106 discharging in series (24 volts/40 amps) and another two EESDs 106 discharging in series (24 volts/40 amps) would result in a useable current of 24 volts and 80 amps. The description relating to FIGS. 5A-5B include more details regarding the second discharging switching subsystem 806.

Figure 4:
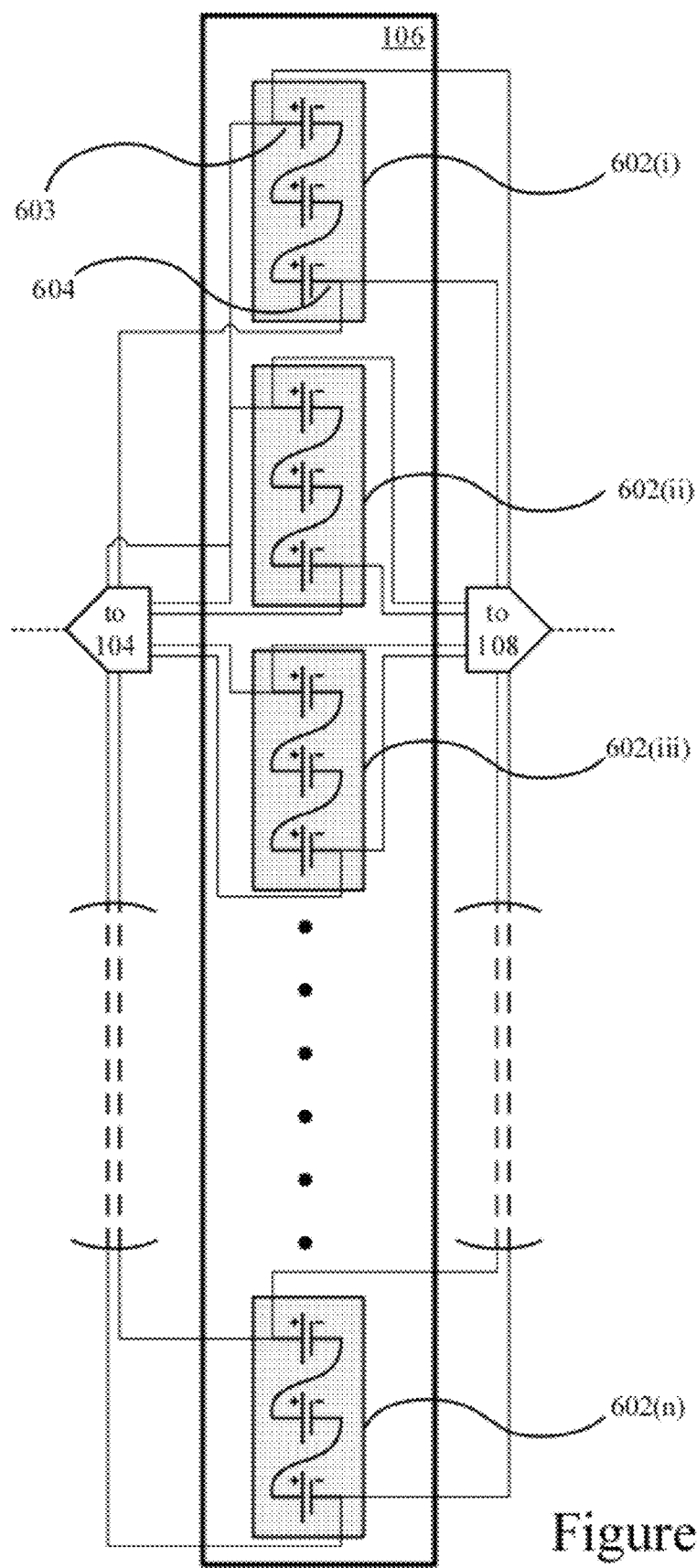
FIG. 4 is a schematic block diagram of one embodiment of a plurality electrical energy storage devices.

FIG. 4 is a schematic block diagram of one embodiment of a plurality 106 of electrical energy storage devices ("EESDs") 602. An EESD 602 may be any device, mechanism, system, machine, apparatus, battery, etc. that can hold a charge for a period of time and can be charged and discharged multiple times (i.e. rechargeable). Each EESD 602 includes a positive terminal 603 and a neutral terminal 604. These terminals 603, 604 are each electrically connected to the switching devices 404, 804 of the charging switching subsystem and the discharging switching subsystem (see FIGS. 3A-3B).

The plurality 106 of EESDs 602 generally stores the electricity generated at the electrical energy source 102 and may disburse the power according to the demand of the load 110. As described above with reference to the electrical energy source 102 in FIGS. 2A-2B and as described below with reference to the load 110 in FIGS. 5A-5B, the source and the load may fluctuate and vary over time. The EESDs are, for selected periods of time, able to substantially absorb any fluctuations in the power supplied and are also able to discharge power according to the fluctuations of the power demanded by the load 110.

In one embodiment, the plurality 106 of EESDs 602 includes multiple electro-chemical battery packs, and each battery pack includes multiple individual battery cells. For example, rechargeable lithium ion batteries, nickel-metal hydride batteries, and nickel-cadmium batteries, among others, may be used in the plurality 106 of EESDs 602. In another embodiment, the EESDs 602 used in the system 100 are lead-acid type batteries as are used in conventional automobiles. Since electro-chemical batteries operate by using oxidation and reduction reactions, the rate of charge/discharge may be too slow for some applications. Therefore, in some applications, other types of EESDs 602, such as capacitors may be used in the system 100.

Capacitors may be used as EESDs 602 in the power conditioning system 100. Because capacitors store energy in an electrical field, capacitors generally are capable of charging more rapidly than electro-chemical batteries and therefore may be better suited for certain implementations when quickly charging the EESDs 106 is important. In one embodiment, a capacitor may be charged to capacity in less than five seconds. Capacitors are generally formed with two plates, one positively charged and the other negatively charged. The plates are separated by a thin insulating material known as a dielectric. In one embodiment, 500 Farad "Super Capacitors", manufactured by Xstatic, may be used as EESDs 106. Also, Maxwell Corporation 48 Farad Supercapacitors "Ultracapacitors" (model number BMOD0165-P048 of San Diego Calif.) may be used as EESDs 602. In one embodiment, super-capacitors are used as the EESDs because of the high energy density and quick charging rate of super-capacitors. Conventional electrolytic capacitors may only be charged to a few milliFarads while state-of-the art super-capacitors may be charged up to several Farads.

Other types of batteries may also function as EESDs 602. For example, hybrid batteries, which include both electro-chemical energy storage and electrical field energy storage (capacitors), may be used to improve energy storage, decrease battery leakage, increase lifetime cycles, decrease charge time, and/or otherwise facilitate using the power conditioning system. In yet another embodiment, the EESDs may include magnetic field storage devices such as inductors.

Although using the same type of EESD 602 throughout the system appears to work best (a preferential embodiment), it is contemplated that multiple types of EESDs 106 may be utilized in the same system to effectively manage the varying supply and/or demand on the system 100. For example, in some applications one of the EESDs 602 may experience higher or lower temperatures due to the configuration of the system and the rate of charge or discharge. In such situations, it may be desirable to use different types of EESDs 602, such as two different types of capacitors or one capacitor and one electro-chemical battery, in order to effectively and efficiently manage the electricity supply and/or demand in a system.

The number of EESDs 106 in the system 100 in one embodiment is at least two. In another embodiment, many EESDs 602 may be used in the system, as depicted in FIG. 4 with the bottom EESD 602(*n*), where "n" represents the number of EESDs 602 in the system. The number of EESDs 602 in the system 100 may be selected according to the specifics of a given application. For example, a system with comparatively more EESDs 602 will be better equipped to manage large voltage and current fluctuations, both on the supply side (source 102) and the demand side (load 110) than a system with comparatively fewer EESDs 602. In one embodiment, the number of EESDs 602 is in the range of between about 2 and 100. In another embodiment, the number of EESDs 602 is in the range of between 3 and 20. In yet another embodiment, the number of EESDs 602 is 4.

In certain embodiments, each EESD 602 is a battery or capacitor pack that includes multiple battery cells or individual capacitors connected in series. It is contemplated that as few as one or as many as 50 battery cells/capacitors may be interconnected to form a single EESD. In one example, three packs 602 constitute the plurality of EESDs 602 and each pack includes three individual battery cells or capacitors connected in series as depicted in FIG. 4.

The voltage and amp-hour ratings of the batteries or the capacitance of the capacitors may be selected according to the specifics of a given application. In one example, three individual capacitors, each capable of holding a charge of about 4 volts, are connected in series within an individual EESD pack 602, resulting in an EESD with about a 12 volt capacity. In one example using electro-chemical batteries, the battery cells are 12.5 volt, 85 amp-hour batteries connected in series, with each battery pack having a voltage rating of about 36-40 volts.

In one embodiment, the EESDs may be classified into charging and discharging groupings. The groupings represent which individual EESDs 602 are being charged at the same time and which EESDs 106 are being discharged 106 at the same time. As described above with reference to FIGS. 3A-3C, the switching subsystems 104, 108, other EESDs 602 for the same time interval before moving onto the next-in-line EESD 602. In another embodiment, instead of charging a single EESD 602 at a time, a grouping of EESDs 106 may be charged before moving on to charge the other groupings of EESDs 602.

In one embodiment the charge level of each EESD 602 may be required to remain above a certain percentage in order to maintain effective and efficient functionality in the system 100. The factors involved in determining what charge level, if any, the EESDs 602 must be maintained at include, but are not limited to the amount of power demanded, the type and capacity of the EESDs 602, the switching frequency of the switching subsystems 104, 108, 806 and the size, capacity, and fluctuation of the electricity source 102. For example, in one embodiment, the EESDs 602 may be required to remain at least 90% charged in order to effectively and efficiently sustain the operation of the power conditioning system.

In another embodiment, the EESDs 602 may need to remain at least 85% charged in order to effectively and efficiently sustain operation of the power conditioning system. In another embodiment, the EESDs 602 may need to remain at least 75% charged in order to effectively and efficiently sustain operation of the power conditioning system. In another embodiment, the, the EESDs 602 may need to remain at least 50% charged in order to effectively and efficiently sustain operation of the power conditioning system. In yet another embodiment, the EESDs 602 may be able to drop to nearly a 0% charge and still the electrical energy source 102 may be able to recover the charge while the system is in use.

As described above with reference to FIG. 3B, a certain minimum charge level may be maintained in one embodiment by changing the time interval of the pulse charges or by changing the frequency of the pulse charges to individual EESDs 602 or groupings of EESDs. In one embodiment, a user may have to slow or stop the draw on the plurality of EESDs 106 in order to allow the EESDs 602 to recharge to a sufficient level before continuing with normal operation. For example, an EESD 602 may include an adjustable or controllable resistor, such as a potentiometer, for controlling the flow of electricity to the load. Therefore, a certain charge level may be maintained in an individual EESD by controlling the charging and discharging parameters. It has been discovered that keeping the EESDs 602 at a high level of charge during operation allows for a higher power output, at least for a period of time. That is, the power output is greater than the input under such operation.

Figure 5A:
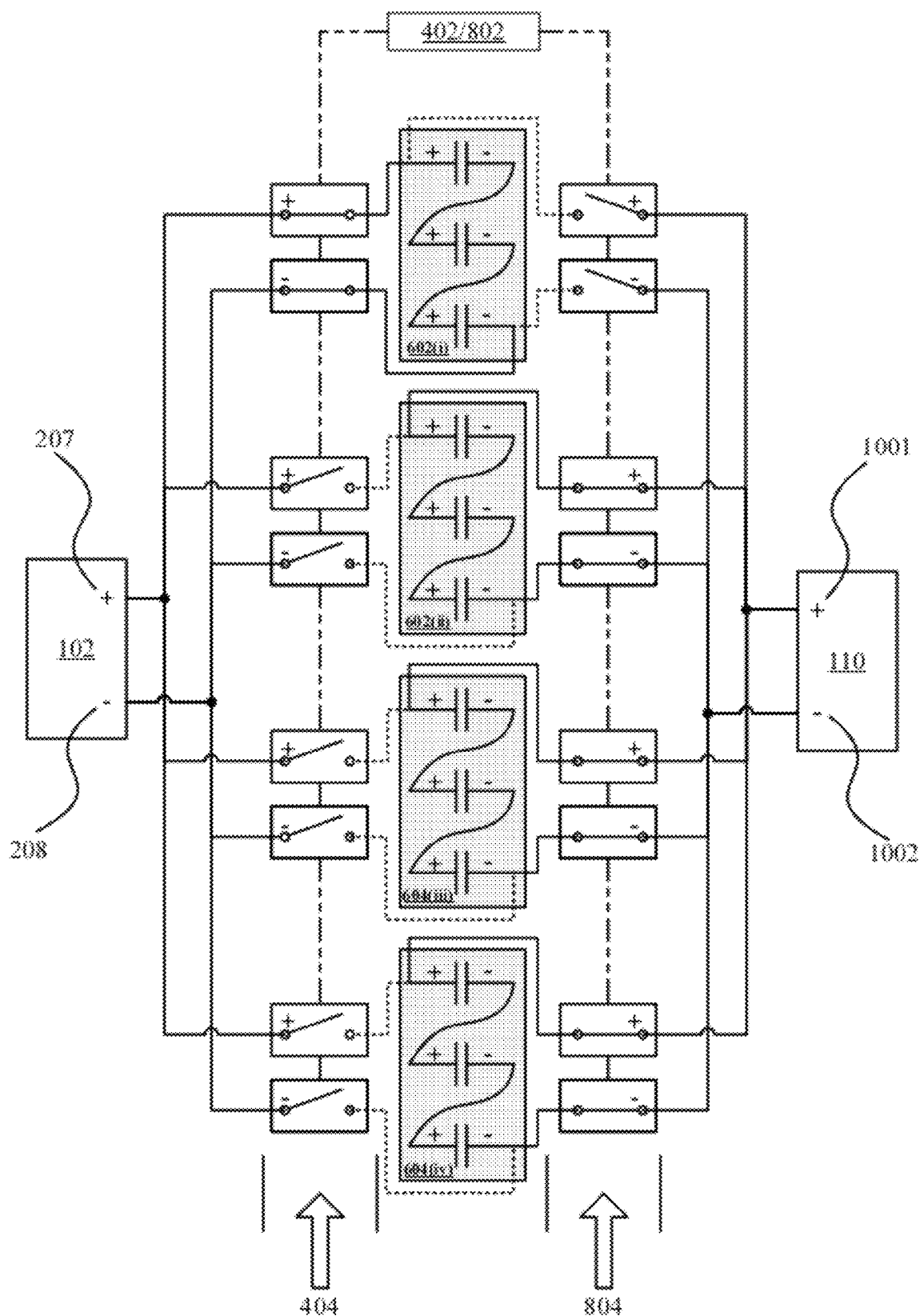
FIG. 5A is a schematic block diagram of a further embodiment of a power conditioning system that includes an electrical energy source, a charging switching subsystem, a plurality of electrical energy storage devices, a discharging switching subsystem, and a load.

FIG. 5A is a schematic block diagram of a further embodiment of a power conditioning system that includes an electrical energy source 102, a charging switching subsystem 104, a plurality 106 of electrical energy storage devices 602, a discharging switching subsystem 108, and a load 110. The source 102 generally includes an interface having a positive source connection 207 and a neutral source connection 208 and the load 110 generally includes an interface having a positive load connection 1001 and a neutral load connection 1002. The interfaces may include components for electrically connecting to the source 102 and/or the load 110. The power conditioning system may be implemented to power various loads 110, including portable dynamic loads 110, such as an electric motor in a vehicle or substantially static loads 110, such as a power grid 110.

The power conditioning system generally can be adapted and designed according to the specific requirements of a given load 110. The load in one embodiment is a power grid and the power conditioning system may include a power plant as the electrical energy source 102 and the plurality of EESDs 106 may include super-capacitors. The load 110 may further include conditioning components such as rectifiers and/or inverters to smooth or otherwise condition the power being drawn from the EESDs.

In one embodiment, the load 110 is exclusively powered by drawing electricity from the plurality 106 of EESDs 602. In another embodiment, the load 110 may be directly powered, at least partially, by the electrical energy source 102. The load 110 may also be powered in some embodiments by an auxiliary power source, such as non-dispatchable (wind turbine) or base load (nuclear super-heated steam turbine) power generators.

The second switching subsystem 806 is not depicted in FIG. 5A because the discharging EESDs 106 are in one embodiment simply connected in parallel without the need for switching devices. The parallel discharging configuration allows the load 110 to draw from all of the discharging EESDs 106, which may enable the load to draw a current that is substantially higher than the current generated by the source 102. For example, at the instantaneous moment depicted in the embodiment of FIG. 5A, three of the four EESDs are connected to the discharging circuit (load 110) and only one EESD is connected to the charging circuit (source 102). The load is shown drawing from each of the three EESDs and, since the discharging configuration is parallel, the voltage going to the load 110 is the source 102 voltage but the current going to the load 110 is three times the source 102 current.

Figure 5B:
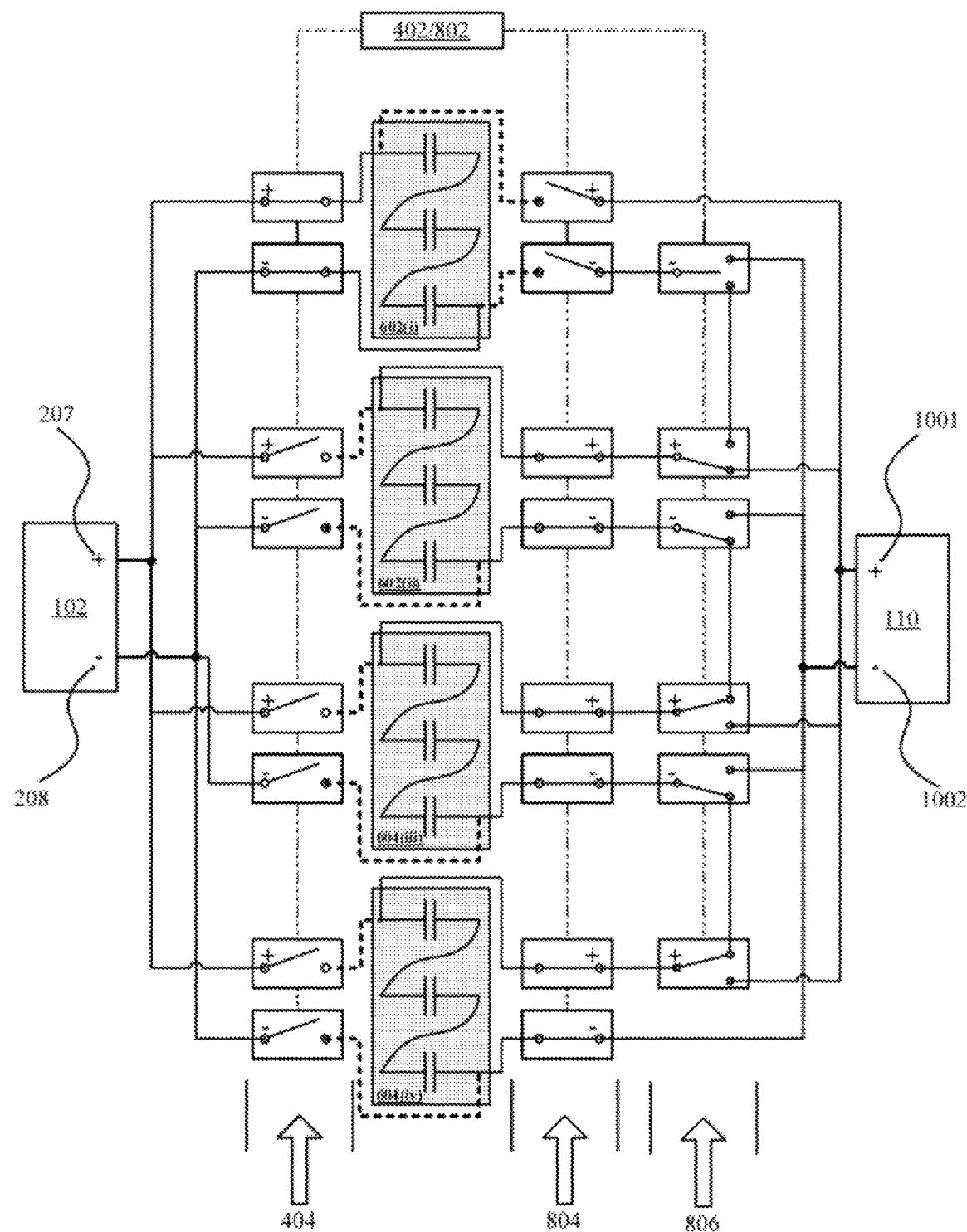
FIG. 5B is a schematic block diagram of a further embodiment of a power conditioning system that includes an electrical energy source, a charging switching subsystem, a plurality of electrical energy storage devices, a discharging switching subsystem, a second discharging switching subsystem, and a load.

FIG. 5B is a schematic block diagram of a further embodiment of a power conditioning system that includes an electrical energy source 102, a charging switching subsystem 104, a plurality 106 of electrical energy storage devices 602, a discharging switching subsystem 108, a second discharging switching subsystem 806, and a load 110. The second discharging switching subsystem 806 is shown interconnecting the three discharging EESDs 602 in a series configuration. Consequently, the voltage going to the load 110 is triple the source 102 voltage while the current going to the load 110 is the same as the source 102 current.

In other embodiments, many EESDs 602 may be included in the system, and multiple groupings of multiple EESDs 602 may be configured to charge and discharge according to a desired power conditioning procedure. In an example where ten EESDs are used in the system, the system may be configured such that two EESDs are charged for a selected time interval while the remaining eight are discharged for the selected time interval. The charging and discharging switching subsystems 104, 108 successively step through and charge two EESDs and discharge eight EESDs in a repeating cycle. A cycle is complete once the switching subsystems 104, 108 have swept through all of the EESDs 602 and each EESD 602 had been charged/discharged for two (exemplary only) intervals.

The discharging EESDs may be interconnected in a variety of configurations using the second discharging switching subsystem 806. For example, four out of eight discharging EESDs may be interconnected in series (multiplying the voltage) and the other four of the eight discharging EESDs may be interconnected in parallel (multiplying the current). Thus, when the two configurations are connected at the load 110, both the amperage and the voltage going to the load may be higher than the source 102 amperage and voltage.

It is also contemplated that auxiliary stand-by EESDs may be included in the power conditioning system so that if one of the "primary" (charging/discharging EESDs) EESDs is in need of repair, the switching subsystems 104, 108, 806 can isolate the defective EESD and re-route the charging/discharging circuits to include the now activated auxiliary stand-by EESD.

Figure 6:
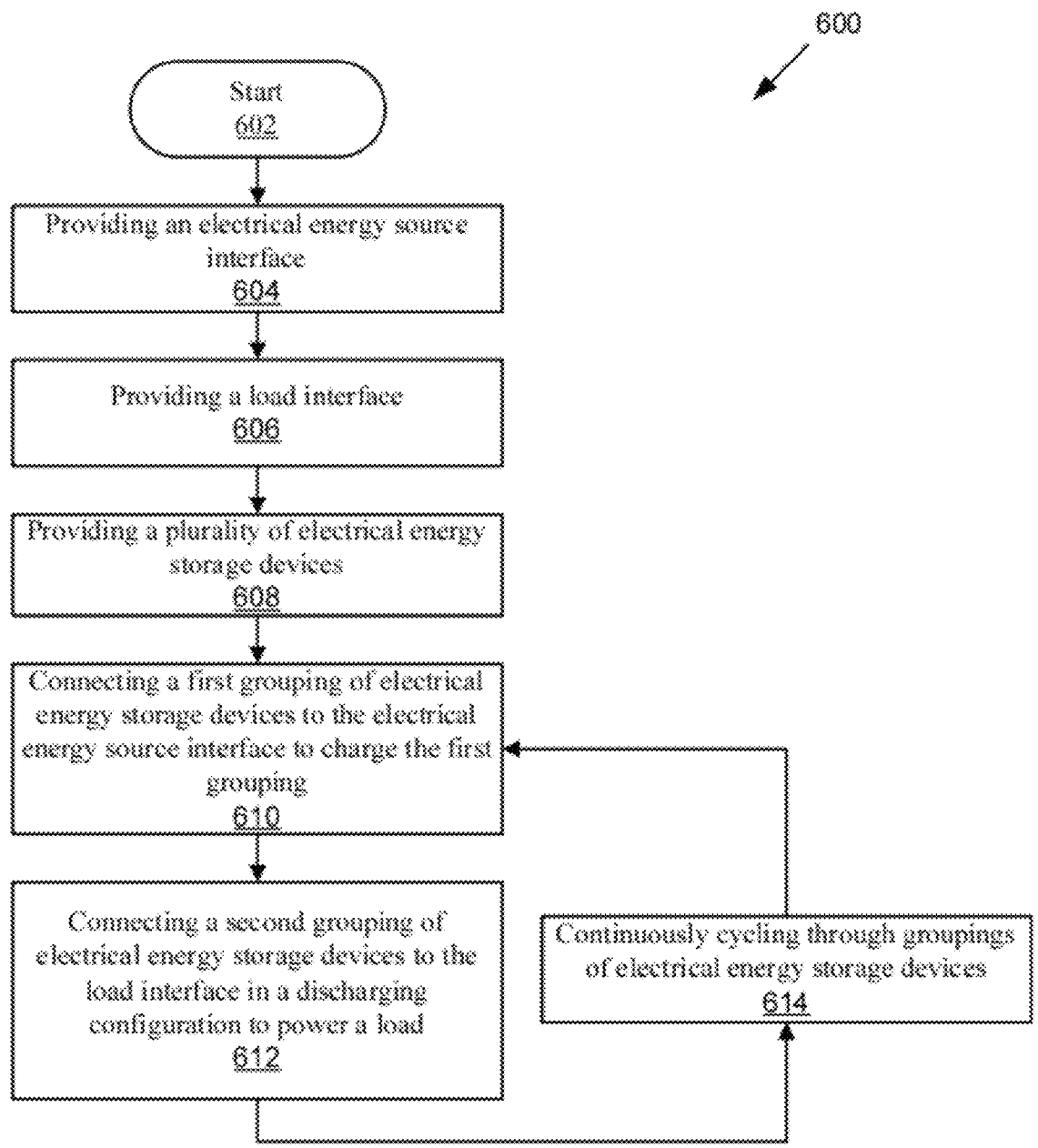
FIG. 6 is a schematic flow chart diagram of a method for using the power conditioning system.

FIG. 6 is a schematic flow chart diagram of a method for using the power conditioning system. The method 600 starts 602 and includes providing 604 an electrical energy source interface, providing 606 a load interface, and providing 608 a plurality of electrical energy storage devices. These provided components are substantially the same as the components described above.

The method continues by connecting 610 a first grouping of electrical energy storage devices to the electrical energy source interface to charge the first grouping, connecting 612 a second grouping of electrical energy storage devices to the load interface in a discharging configuration to power a load. The method includes continuously cycling 614 through groupings of electrical energy storage devices while the power conditioning system is in operation.

The described features, structures, or characteristics of the disclosure may be combined in any suitable manner in one or more embodiments. One skilled in the relevant art will recognize that the subject matter of the present application may be practiced without one or more of the specific details, or with other methods, components, materials, and so forth. In other instances, well-known structures, materials, or operations are not shown or described in detail to avoid obscuring aspects of the disclosure.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A power conditioning system comprising:
   an electrical energy source interface for connecting to an electrical energy source;
   a load interface for connecting to a load;
   a plurality of electrical energy storage devices connected with the load interface in a discharging configuration, wherein the plurality of electrical energy storage devices are divided into at least two groupings, wherein each grouping comprises less than all of the individual electrical energy storage devices;
   a charging switching subsystem that successively electrically connects each grouping of electrical energy storage devices to the electrical energy source interface for a selected time interval in a repeating cycle.

2. The system of claim 1, further comprising a discharging switching subsystem that electrically disconnects the grouping of electrical energy storage devices from the load interface for the selected time interval.

3. The system of claim 2, further comprising a second discharging switching subsystem for controlling the discharging configuration.

4. The system of claim 1, wherein the discharging configuration is a series configuration.

5. The system of claim 1, wherein the discharging configuration is a parallel configuration.

6. The system of claim 1, wherein the discharging configuration is a combination of series and parallel circuits.

7. The system of claim 1, wherein a grouping comprises a single electrical energy storage device.

8. The system of claim 1, wherein the load is connected to and draws power solely from the electrical energy storage devices.

9. The system of claims 1, wherein the charging switching subsystem, the discharging switching subsystem and the second discharging switching subsystem further comprise processors and electronic switching devices, wherein the processors control the opening and closing of the electronic switching devices.

10. The system of claim 9, wherein the electronic switching devices are electromechanical relays.

11. The system of claim 1, wherein the selected time interval is in the range of between about 0.001 seconds and 5.0 seconds.

12. The system of claim 1, wherein the selected time interval is in the range of between about 0.01 seconds and 1.0 second.

13. The system of claim 1, wherein the selected time interval is about 0.1 seconds.

14. The system of claim 1, wherein the number of electrical energy storage devices is four.

15. The system of claim 1, wherein the number of electrical energy storage devices is eight.

16. The system of claim 1, wherein the electrical energy storage devices comprise electro-chemical batteries.

17. The system of claim 1, wherein the electrical energy storage devices comprise capacitors.

18. The system of claim 1, wherein the electrical energy storage devices comprise super-capacitors.

19. The system of claim 1, wherein the electrical energy storage devices are electrical energy storage packs comprising multiple super-capacitors.

20. The system of claim 19, wherein each electrical energy storage pack comprises three super-capacitors connected in series.

21. The system of claim 1, wherein a neutral source connection of the electrical energy source is not directly connected to a system ground.

22. The system of claim 1, wherein the electrical energy storage devices retain a charge level of at least 75% during substantially the entire time of operation.

23. The system of claim 1, wherein the electrical energy storage devices retain a charge of at least 90% during substantially the entire time of operation.

24. The system of claim 1, wherein the electricity flowing out of the electrical energy source is less than the maximum power output of the combined electrical energy storage devices.

25. The system of claim 1, wherein a first voltage and a first current flow out of the electrical energy source to charge the electrical energy storage devices and a second voltage and a second current are flow out of the electrical energy storage devices to power the load, wherein the first voltage is different than the second voltage and the first current is different than the second current.

26. The system of claim 1, wherein the electrical energy source interface is a hydrocarbon engine coupled with a generator in a vehicle and the load interface is an electric motor in a vehicle.

27. A method for conditioning power comprising:
   providing an electrical energy source interface;
   providing a load interface;
   providing a plurality of electrical energy storage devices, wherein the plurality of electrical energy storage devices are divided into at least two groupings, wherein each grouping comprises less than all of the electrical energy storage devices;
   connecting a first grouping of electrical energy storage devices to the electrical energy source interface to charge the first grouping;

connecting a second grouping of electrical energy storage devices to the load interface in a discharging configuration to power a load; and continuously cycling through charging the plurality of electrical energy storage devices by successively electrically connecting individual groupings of electrical energy storage devices to the electrical energy source interface.

28. A power conditioning system comprising:

an electrical energy source interface comprising a positive source connection and a neutral source connection;

groupings of electrical energy storage packs, each grouping comprising at least one electrical energy storage pack and each electrical energy storage pack comprising a positive terminal and a neutral terminal, wherein each grouping comprises less than all of the electrical energy storage packs;

a load interface comprising a positive load connection and a neutral load connection;

a charging switching subsystem that electrically connects each individual grouping successively to the electrical energy source for 0.1 seconds in a repeating cycle by electrically connecting the positive source connection of the electrical energy source to each positive terminal of the electrical energy storage packs in one grouping and electrically connecting the neutral source connection of the electrical energy source to each neutral terminal of the electrical energy storage packs in the one grouping, wherein each electrical energy storage pack not included in the one grouping is disconnected from the electrical energy source for 0.1 seconds; and a discharging switching subsystem that electrically disconnects each individual grouping successively from the load for 0.1 seconds in the repeating cycle by electrically disconnecting each positive terminal of the electrical energy storage packs in the one grouping from the positive load connection of the load and electrically disconnects the neutral terminal of each of the electrical energy storage packs in the one grouping from the neutral load connection of the load, wherein each electrical energy storage pack not included in the one grouping is connected in parallel to the load for the 0.1 seconds.

* * * * *